Aug. 25, 1970    A. WINSEL ET AL    3,525,644
DEVICE FOR THE GENERATION OF AN AREA FREE OF ELECTRICAL FIELD
IN THE ELECTROLYTE CIRCUIT OF ELECTROCHEMICAL SYSTEMS
Filed Feb. 6, 1968    4 Sheets-Sheet 1

INVENTORS
August Winsel
Dietrich Sprengel
BY Stephens, Huettig and O'Connell
ATTORNEYS

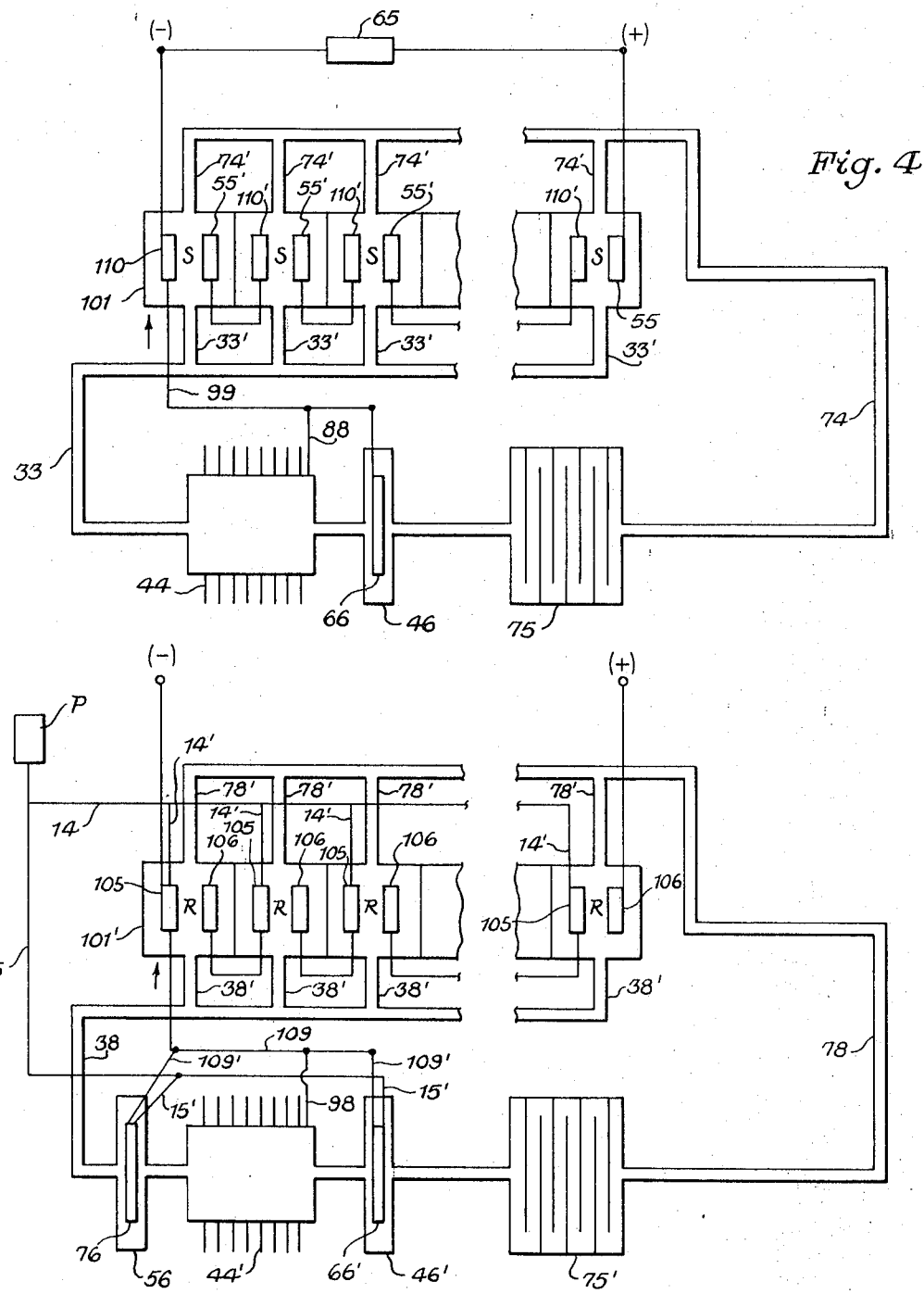

United States Patent Office 3,525,644
Patented Aug. 25, 1970

3,525,644
DEVICE FOR THE GENERATION OF AN AREA FREE OF ELECTRICAL FIELD IN THE ELECTROLYTE CIRCUIT OF ELECTROCHEMICAL SYSTEMS
August Winsel, Kelkheim, Taunus, and Dietrich Sprengel, Kelkheim, Germany, assignors to Varta Aktiengesellschaft, Frankfurt am Main, Germany
Filed Feb. 6, 1968, Ser. No. 703,350
Claims priority, application Germany, Feb. 11, 1967, V 32,953
Int. Cl. H01m 27/00; C23f 13/00
U.S. Cl. 136—86
27 Claims

ABSTRACT OF THE DISCLOSURE

An area substantially free of an electrical field is generated within the closed electrolyte circuit of an electrochemical system comprising an electrochemical device such as a fuel cell battery by placing in the circuit at least one additional electrode.

BACKGROUND OF THE INVENTION

Field of the invention

The invention relates to safeguarding, against corrosion, components of the electrolyte circuits of electrochemical systems.

Description of the prior art

In the construction of electrochemical systems, especially those employing fuel cell batteries, it is necessary to make accommodations in the electrolyte circuit for elements of construction which are corrodible. In such instances, copper and other corrodible materials of construction, which are corroded and dissolved in the particular electrolyte used if they are at an electrical potential more positive than the hydrogen potential, can be used in the construction elements, as for example, in the pumps and valves of an electrolyte cooler, if the construction elements are placed in an area from which corroding electric currents are excluded. Such areas are preferably located in a portion of the electrolyte circuit which is outside the battery or other electrochemical device. Those in the art, therefore, have been faced with the problem of providing an area within the electrolyte circuit of electrochemical systems which is free of a field of electric force and in which corrodible materials of construction may be employed without risk of corrosion.

SUMMARY OF THE INVENTION

The object of the present invention is to provide means whereby areas which are free of fields of electric forces may be provided in the electrolyte circuit of electrochemical systems, especially fuel cell batteries.

The essence of the present invention lies in providing at least one additional electrode within the electrolyte circuit, which is provided with a fluid fuel containing hydrogen and thereby attains a potential near that of a reversible hydrogen electrode.

BRIEF DESCRIPTION OF THE DRAWING

FIG. 4 shows a detailed embodiment of the present invention employing one additional electrode, and a fuel cell battery, in which methanol is used as the fuel.

FIG. 5 shows a detailed embodiment of the present invention employing two additional electrodes and an electrolyzer as an electrochemical device.

DESCRIPTION OF THE PREFERRED EMBODIMENT

Figure 1:
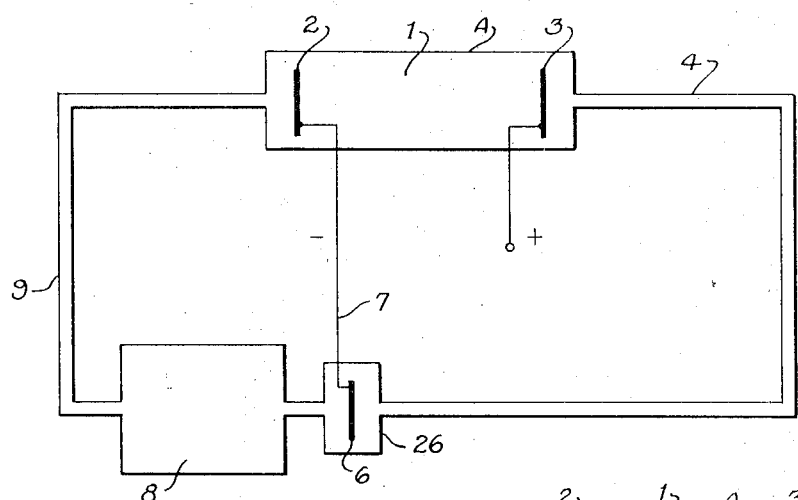
FIG. 1 shows the closed electrolyte circuit of a fuel cell battery in which a hydrogen diffusion electrode is inserted as the additional electrode in accordance with the present invention.

The problem facing those in the art, as noted above, has been solved according to the present invention so as to provide a device for the generation of a field free area in the electrolyte circuit of an electrochemical system wherein an additional electrode is arranged in the closed electrolyte circuit. The additional electrode is placed in direct contact with the electrolyte being circulated through the circuit, and in a portion of the circuit which is outside the electrochemical device, i.e., battery, etc., which is employed in such system. In this way a field free area is provided in the portion of the electrolyte circuit which is in between the additional electrode and the electrode with the lowest potential in the electrochemical system, since the induction current which emanates from the electrode with the highest potential, e.g. an oxygen electrode, is discharged at the additional electrode and has no effect in this area.

The electrochemical systems which may be benefitted by the present invention include all those which have an electrolyte circulation circuit therein which contains elements of construction which would be susceptible to corrosion by exposure to the ionic currents that form in the electrolytes employed in such systems. Fuel cell systems are the most common of such electrochemical systems. Such fuel cell systems comprise batteries which are used as a source of electric current. A system based on accumulator batteries which are adapted for use with hydrogen diffusion electrodes would be another example of an electrochemical system which could employ an electrolyte circulation circuit therewith and with which the present invention could be employed. These electrochemical systems all contain one or more devices such as a battery, which employs an electrolyte electrochemically.

The additional electrodes which are to be employed according to the present invention are of the catalytic anode type which consume hydrogen containing fuels therein such as hydrogen; hydrocarbons, such as methane, ethane, propane, butane, low molecular weight paraffins and olefins such as ethylene and propylene; other organic compounds such as formaldehyde and methanol; inorganic compounds such as hydrazine and alkali metal borohydrides and other commonly employed hydrogen containing fuels. The fuel can be used in the form of a liquid or a gas. The additional electrodes may be of a porous or non-porous type. During the course of the use of these additional electrodes, according to the present invention, they will consume fuel and produce positive ions therein as though they were being employed in a conventional fuel cell. The additional electrode should preferably operate in the electrolyte employed in the electrochemical system in the same range of potential as the most negative anode being used in the fuel cell of such electrochemical system. For this reason it is preferable that the additional electrode be of the same size, construction and composition, and use the same fuel therein, as the most negative anode being employed in the fuel cell. The preferred additional electrode is a porous hydrogen diffusion electrode.

A number of different types of electrolytes are used in electrochemical systems. These include both acid and basic materials which are commonly employed in the form of aqueous solutions. Such electrolytes would include, therefore, concentrated aqueous solutions of alkali metal hydroxides and carbonates, sulfuric acid, hydrochloric acid, phosphoric acid and nitric acid.

The present invention is intended to be used to protect against corrosion materials of construction which are used in the construction of components of electrolyte circuits handling all of the above mentioned electrolytes and other electrolytes employed in electrochemical systems. The materials of construction which may be so protected are preferably those metals or other elements, or alloys or other compositions made therewith which will dissolve in the electrolyte with which they come in physical contact at a potential which is more positive than the potential of a reversible hydrogen electrode. Materials of construction having a potential which is considerably more negative than the potential of a reversible hydrogen electrode, for example zinc in hydrochloric acid or aluminum in aqueous sodium hydroxide, would not be protected against corrosion if they were used with the present invention at the potential of the reversible hydrogen electrode. Under such conditions the corrosion thereof would even be accelerated. Examples of materials which can be readily protected with the device of the present invention include the metallic elements copper, nickel and iron.

It is readily easy to ascertain whether or not a material such as the above mentioned materials, or alloys thereof or compositions made therewith, or other metals or still other materials can be protected against corrosion in a given electrolyte fluid with the use of an auxiliary electrode in accordance with the present invention. Tables are available in standard reference books which will indicate whether or not a proposed material of construction will go into solution in a proposed electrolyte at a potential which is more positive than the potential of a reversible hydrogen electrode. If such information, however, is not available in such tables for specific proposed materials of construction a simple test will indicate whether or not the proposed material would undergo corrosion in the proposed electrolyte. In such test a sample of the proposed material of construction is placed in the electrolyte in that portion of the electrolyte circuit located between the additional electrode and the most negative electrode in the cell of the electrochemical system. The proposed material of construction is then galvanically connected to the additional electrode and a current measuring device such as a microampmeter is used to monitor any electric current flowing through the additional electrode. Electric current will flow through the additional electrode if corrosion of the proposed material of construction is taking place under the described conditions.

Generally, only one additional electrode is needed for each electrochemical system being improved therewith according to the present invention, regardless of the number of individual electrochemical devices such as cells of a battery that may be present in such system. Each of such cells of course would contain one negative and one positive electrode. More than one additional electrode, however, may be used in accordance with the present invention. The number and positioning of the additional electrodes and the galvanic connection, if necessary, of the additional electrode to the material of construction or part being protected can be varied to provide numerous different arrangements of such components of the electrolyte circuit. The part being protected is preferably located in that portion of the electrolyte circuit which is outside the electrochemical device or cells. The most simplest arrangement would consist of galvanically connecting the additional electrode to that part or element of construction of the electrolyte circuit which is to be protected, such as a cooler made of copper or iron and used as part of the electrolyte circuit to cool the electrolyte which is passed through it for this purpose. The additional electrode would also be inserted in the electrolyte circuit in the vicinity of the part being protected and between such part and the most positive electrode in the electrochemical cell. The additional electrode is placed in direct contact with the electrolyte flowing in the circuit, i.e., it is in electrolyte supply communication with such electrolyte. This arrangement provides that the part being protected, such as the copper cooler, has a potential which is approximately the potential of the additional electrode and which is also approximately the potential of a reversible hydrogen electrode in such system. This arrangement thus prevents the copper part from attaining a potential which is higher than 450 mV, based on the reversible hydrogen electrode potential.

Another arrangement according to the present invention consists of placing an additional electrode on each side of the part to be protected. The two additional electrodes are then galvanically connected together. That portion of the electrolyte circuit which is then located between the two additional electrodes, and which has the part to be protected therein, will be substantially free of any electric field during the operation of the electrochemical system, and the part will thus be protected against corrosion by the electrolyte. The part may also be galvanically connected to the additional electrodes in order to allow it to have the potential of a reversible hydrogen electrode in such system.

A preferred modification of the present invention, which involves the use of two additional electrodes as described above, is one in which the additional electrode which is in that portion of the electrolyte circuit lying between the most negative electrode in the electrochemical cell and the part to be protected is replaced by such negative electrode. In this case the remaining additional electrode and the most negative electrode in the cell are galvanically connected together and the part to be protected may also be galvanically connected with such two electrodes.

In order to prevent overloading the additional electrode, the portion of the electrolyte circuit which is located between the additional electrode and the electrode in the cell having the most positive potential should have an ohmic resistance. The amount of this resistance, in ohms, can be readily determined from the permissible current density for the additional electrode and the voltage or potential between the additional electrode and the cathode in the cell which is closest to the additional electrode. The resistance should be in the range of 10 to 1000 ohms. In general, it is sufficient if the additional electrode is placed in the circuit at such a distance from the cathode in the cell that the electric resistance of the electrolyte fluid in that portion of the electrolyte circuit between the cathode and the additional electrode has a retarding effect on the ionic current in such portion of the electrolyte circuit. In order to provide for the use of as small an additional electrode as possible the ohmic resistance of the above mentioned portion of the electrolyte circuit should be made as large as possible. The ohmic resistance of the electrolyte circuit can be increased, if desired, by inserting in the circuit devices which will increase the electric resistance of the electrolyte circuit. An example of such devices is the labyrinthian separatory discs disclosed in copending U.S. application Ser. No. 564,938 filed July 13, 1966.

In the drawings FIG. 1 shows a schematic representation of a device of the present invention. The fuel cell batery 1 contains 17 fuel cell elements each of which has a hydrogen diffusion electrode and an oxygen diffusion electrode and electrode 2 is the hydrogen diffusion electrode with the lowest possible potential. The oxygen electrode 3 is closest to electrolyte outlet line 4 which forms a portion of the electrolyte circuit. The battery elements are housed in a container A, which represents the individual electrolyte chambers of the fuel cell battery which are in communication with one another. The additional hydrogen electrode 6 is galvanically connected over electric line 7 with electrode 2 of the battery which is the hydrogen diffusion electrode having the lowest potential. The hydrogen feed line for electrode 6 is not shown but electrode 6 operates as a hydrogen electrode and consumes hydrogen during the operation of the fuel cell battery. Electrode 6 is preferably arranged inside a suitable container 26 during the operation of the electrolyte circuit. Container 8 is filled with electrolyte and represents schematically, a cooler, a pump or a magnetic valve for the electrolyte, and it forms, together with electrolyte circuit section 9, which connects container 8 to the inlet of the interconnected electrolyte chambers of the fuel cell battery, the field free area of the circuit. The container 8 and section 9 of the electrolyte circuit are free of an electrical field because they are contained between two electrodes 2 and 6 of identical polarity. The shunt current of ions emanating from the oxidation electrode 3 which has the highest potential or which lies closest to the outlet line 4 for the electrolyte recirculation system does not reach hydrogen diffusion electrode 2 but terminates in the additional electrode 6 and flows from additional electrode 6 to the negative pole of the fuel cell battery as a stream of electrons.

When additional electrode 6 is not present in the electrolyte circuit, a part of the voltage of the fuel cell battery is present at every point in the electrolyte circuit lying outside container A and between electrodes 2 and 4 and the electrolyte produces a specific electrical resistance. This voltage varies with changes in the resistance and a current then flows through the electrolyte with variations in the voltage. The current flowing in the electrolyte is not an electronic charge or current but an ionic charge or current. The ions emanating from oxidation electrode 3 flow, therefore, in part, not to the closest fuel electrode, but over electrolyte circuit 4 and 9 to fuel electrode 2. In area 8 shown in FIG. 1, in the absence of additional electrode 6, a potential exists, therefore, which corresponds to the voltage drop caused by the ionic current. When additional electrode 6, is inserted in the electrolyte circuit close to area 8 as shown in FIG. 1, and electrode 6 is supplied with fuel and allowed to consume the fuel and thereby produce negative ions therein, the stream of positive ions which emanate from oxygen electrode 3 and flow through electrolyte line 4 to electrode 6 terminates as such in electrode 6 when they come in contact with such negative ions. The stream of ions from electrode 2 thus terminates in electrode 6 and the area of the electrolyte circuit which is between electrode 6 and electrode 2 is free of an electrical field. The size of the ionic current in sections 4, 8 or 9, or in additional electrode 6, is determined by the voltage between electrodes 3 and 2 or 3 and 6 and the electrical resistance of the corresponding portion of the electrolyte circuit.

The voltage of a given point P in the electrolyte circuit between electrodes 3 and 6 is equal to the product of the ionic current flowing between 3 and 6 and the ohmic resistance of the electrolyte circuit between point P and electrode 6. Electrode 6 has the lowest potential within the circuit and is used, therefore, as a reference point.

As an additional measure it is also possible, according to the present invention, to maintain metal parts in container or area 8 at the most negative potential possible and thereby also suppress the corrosion thereof, by connecting the metal part galvanically with electrode 6 and thereby maintaining it at the potential of electrode 2. This optional feature of the present invention is illustrated in FIG. 2 wherein metal part 10, for example, a copper impeller, is galvanically connected over electric line 11 to electrode 6 through electric line 7.

The size of electrode 6 which is to be used can be influenced to some extent by the amount of electrical resistance offered by the electrolyte in the electrolyte circuit. Generally speaking, the larger the flow of ions in the electrolyte, the larger must be the additional electrode that is employed. If the electrolyte has a relatively low electrical resistance, the electrolyte circuit will carry a heavy load of electrolyte and a high ionic current will flow in the electrolyte. Thus, by increasing the electric resistance of the electrolyte it is possible to impede or lower the ionic current in the electrolyte, thus allowing for the use of a smaller additional electrode 6. One way of accomplishing this end is to insert, in the electrolyte circuits, devices which will increase the electrical resistance of the electrolyte. Resistance device 5 is used for this purpose in the arrangement shown in FIG. 2. Device 5 is a known device such as the labyrinthian disc devices disclosed in copending U.S. pat. application S.N. 564,938 filed July 13, 1966. Such resistance devices provide high electrical resistance, of the order of about 100 to 10,000 ohms, and a small resistance against the flow of electrolyte therethrough. The additional electrode of the devices of the present invention is connected to a supply of fuel, such as hydrogen gas for use in the additional hydrogen electrode 6 of FIGS. 1 and 2, and such additional electrodes must produce an anodic current which corresponds to the electrical resistance of electrolyte line 4 in FIG. 1, or the electrical resistance of electrolyte line 4 plus that of resistance device 5 in FIG. 2, and to the voltage which is applied to the resistances of the circuits formed by the electrolyte circuit between electrodes 3 and 6 in such figures. The maximum voltage is equal to the terminal voltage of the fuel cell battery in the embodiment of the invention shown in FIG. 1.

The construction element which is to be located in the field free area of the electrolyte circuit may also be protected if it is galvanically connected to the negative pole of the fuel cell battery. This mode of operation offers protection against corrosion to, for example, copper parts, if the potential of the part is less than 450 millivolts more positive than the reversible hydrogen potential, since otherwise, the copper goes into solution in the electrolyte. Hence, a condition that must be present according to the present invention is that the voltage drop caused by the ion current flowing in the outer electrolyte circuit must be less than 450 millivolts at resistance $R_1$, which resistance is formed by the electrolyte fluid located in the portion of the circuit between the element of construction which is to be protected and the hydrogen diffusion electrode in the battery having the negative potential.

Figure 2:
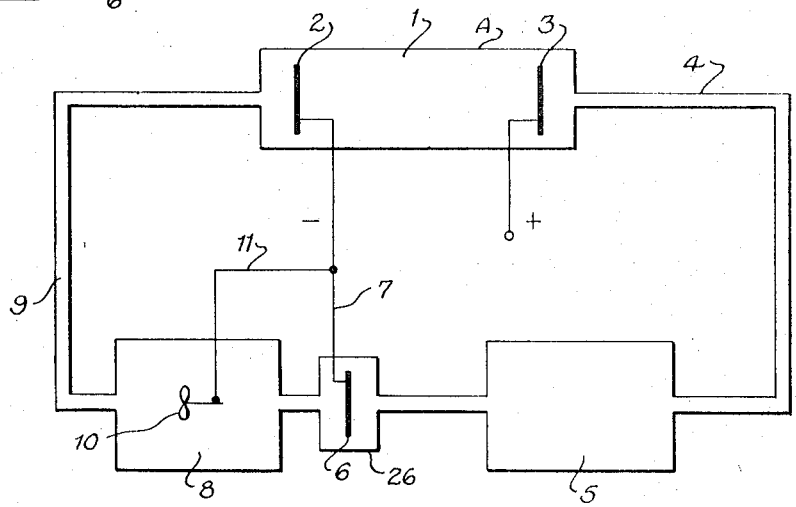
FIG. 2 shows the closed electrolyte circuit of a fuel cell battery as shown in FIG. 1 in which a portion of the electrolyte circuit is formed by a device having a high electrical resistance.

It is also possible, in principle, to protect a part placed in chamber 8 against corrosion without using additional electrode 6 of the invention as shown in FIG. 1 or 2. If the resistance of the section of the circuit having the high resistance device 5 therein is designated as $R_2$, and if the resistance of the other elements of construction in this section is ignored, then the overall relationship of the resistances $R_1$ of the remainder of the circuit and $R_2$ can be expressed as:

$$\frac{R_1}{R_1+R_2} < \frac{0.47}{U}$$

wherein U is the terminal voltage of the fuel cell battery, in volts, if copper parts are to be protected.

For a fuel cell battery with a terminal voltage of 24 volts therefore, the above-given numerical relationship of the two resistances would have to be $R_1/R_2 < 0.02$.

This relationship indicates, however, that resistance $R_2$ would have to be a very large value, which could be realized only by overcoming great difficulties in the construction of the section of the circuit having the high electrolyte resistance i.e. section 5 in FIG. 2.

The use of an additional electrode as described above for the device of the present invention in FIG. 1 or 2 is, therefore, to be preferred. The resistance of the electrolyte circuit located between the positive electrode of the fuel cell battery and the additional electrode amounts to about 150 ohms with a fuel cell battery having a terminal voltage U of 24 volts. This resistance of 150 ohms corresponds to an electric filament of about one meter long and one square centimeter in cross-sectional area. In this total resistance of 150 ohms there is included, in addition to the resistance of the electrolyte conduits in the outer electrolyte circuit, the resistances of the inlets and channels lying between the outlet opening of the electrolyte chambers and the positive electrode of the fuel cell, which latter resistances also lie within the sphere of the corrosive current. From the terminal voltage and the total resistance in the circuit there arises a current of 160 milliamps. This current can easily be supplied in the devices of FIGS. 1 and 2 by an auxiliary hydrogen diffusion electrode which has a diameter of 40 millimeters and is supplied with hydrogen gas at a pressure of 1 kg./cm.$^2$.

Figure 3:
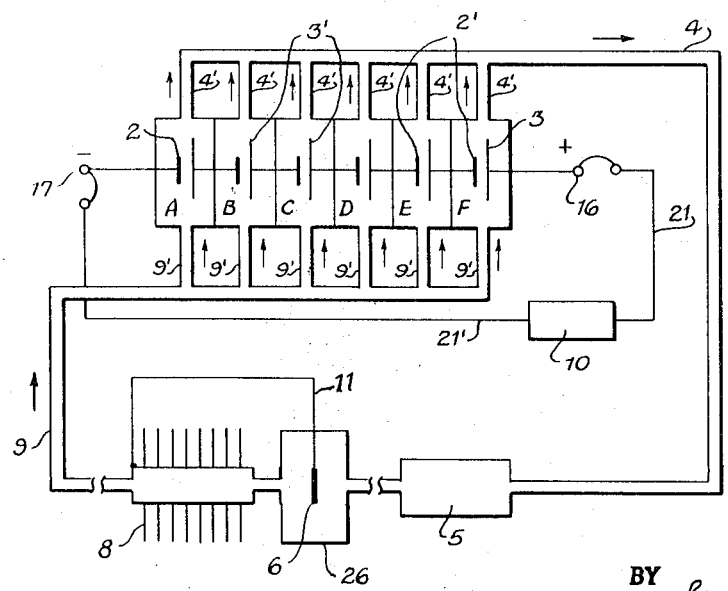
FIG. 3 shows a more detailed embodiment of a closed electrolyte circuit for a fuel cell battery in which one additional electrode is inserted in accordance with the present invention.

FIG. 3 shows a further use of the concept of the present invention with a fuel cell battery. The fuel cell battery consists of six individual fuel cell elements, A, B, C, D, E and F. Each of these fuel cells contains a porous hydrogen diffusion electrode 2 or 2′ and a porous oxygen diffusion electrode 3 or 3′. Electrode 2 is the most negative electrode and electrode 3 is the most positive electrode. The internal gas supply line means for the porous electrodes are not shown in order to simplify the drawings since they are not essential to an understanding of the invention. The electrodes are merely depicted, therefore, as simple rectangles although in fact they are conventional, three dimensional gas diffusion electrodes. The individual cells of the battery are connected together electrically in series, that is, the hydrogen electrode of one cell is electrically connected by an electric line to the oxygen electrode of the next adjacent cell. Electrolyte is supplied to the cells through main electrolyte line 9 and branched lines 9′ and is recovered from the cells for recirculation purposes over branched lines 4′ and main electrolyte line 4. During the circulation of the electrolyte it is also passed, in turn through device 5, additional electrode 6 which is a hydrogen diffusion electrode similar to electrode 2, and electrolyte cooler 8 which is made of copper. Device 5 is one similar to the device 5 employed in the arrangement shown in FIG. 2 above and it provides a high electrical resistance for the electrolyte fluid. Junctures 16 and 17 for the battery are electrically connected by means of electric lines 21 and 21′ through load or electric consuming resistance 10.

The simplest arrangement according to the present invention, which may be shown by reference to FIG. 3, consists in galvanically connecting additional electrode 6, which is housed in container 26, by means of electric line 11 to electrolyte cooler 8. This arrangement is particularly advantageous, moreover, if the electrical resistance of the electrolyte fluid in electrolyte line 4, with or without the presence of device 5, is so high that a flow of ions between oxygen electrode 3 and additional electrode 3 is prevented from going further along the electrolyte circuit and into cooler 8. The oxygen molecules flowing in the electrolyte, therefore, in becoming ionized are prevented from corroding the copper cooler 8 since they react in container 26 with the hydrogen ions which are produced in additional electrode 6 and which are allowed to pass into the electrolyte fluid as the fluid is circulated through container 26.

Figure 3A:
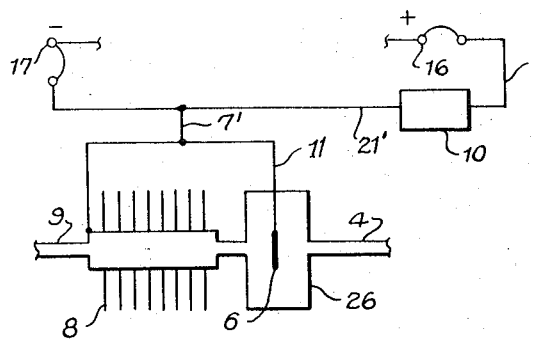
FIGS. 3a and 3b disclose various modifications of the arrangement shown in FIG. 3 in which one additional electrode is employed.
Figure 3B:
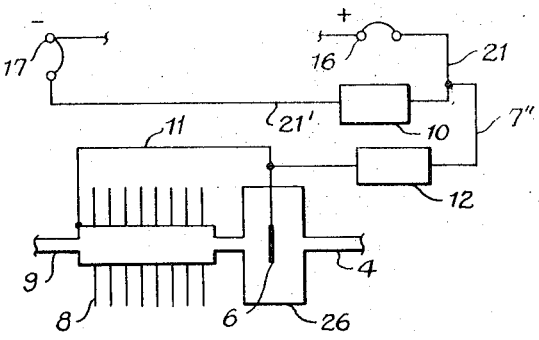

FIGS. 3a and 3b discussed below represent modifications of the arrangement shown in FIG. 3 wherein various electrical connections are shown between lines 11 and 21 or 21′ of FIG. 3.

If a stream of ions still flows in the electrolyte circuit between electrodes 3 and 6, it is expedient to also galvanically connect electrode 6 with electrode 2 by means of electric line 7′, as shown in FIG. 3a, in order to provide for the discharge of electrons produced at electrode 6. During the electrochemical dissolution of hydrogen gas in electrode 6, hydrogen ions go into solution in the electrolyte and electrons are set free at this electrode. The supply of the hydrogen gas to electrode 6 over a suitable gas line is not shown. The thus produced electrons can then flow back over electric line 7′, together with the stream of electrons produced by the fuel cell battery, through load 10 to oxygen electrode 3.

In a further modification of the present invention, and as shown in FIG. 3b instead of having the electrons flow back to electrode 3 over line 7′ the electrons can be allowed to flow back to oxygen electrode 3 over line 7″ and through load 12. Load 12 can be, for example, an incandescent filament lamp, which will indicate whether or not additional electrode 6 is operating.

Figure 3C:
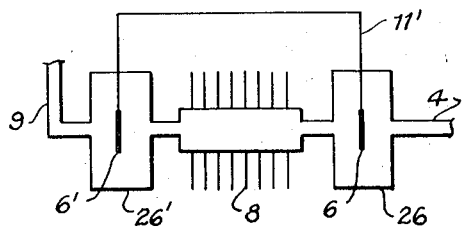
FIG. 3c discloses a modification of the arrangement shown in FIG. 3 wherein two additional electrodes are employed in accordance with the present invention.
Figure 3D:
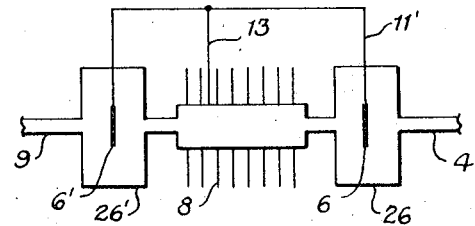
FIGS. 3d, 3e and 3f disclose various modifications of the arrangement shown in FIG. 3c wherein two additional electrodes are employed.
Figure 3E:
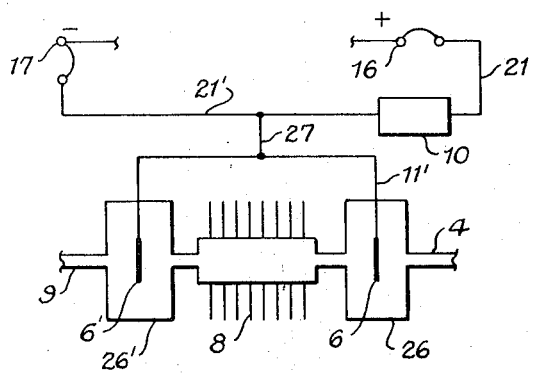
Figure 3F:
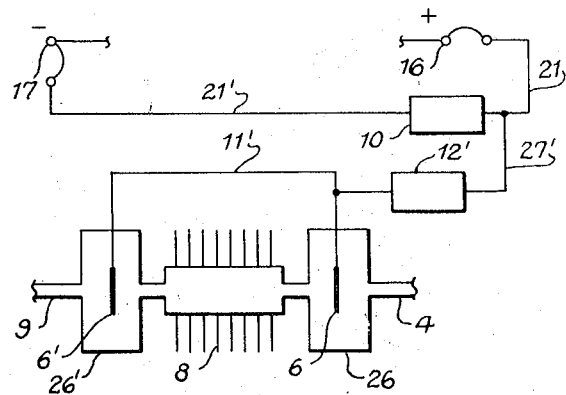

FIG. 3c shows a further modification of the present invention. The arrangement shown in FIG. 3c represents a modification of a portion of the arrangement shown in FIG. 3, that is, that portion of the electrolyte circuit of FIG. 3 which lies between resistance device 5 and electrode 2. In the arrangement of FIG. 3c, additional electrodes 6 and 6′ are arranged, in containers 26 and 26′ respectively, on either side of cooler 8. The two additional electrodes are galvanically connected to one another by means of electric line 11′. The two additional electrodes are both hydrogen diffusion electrodes and the gas line supply means for supplying hydrogen gas to such electrodes are not shown. The part being protected against corrosion, cooler 8, can be galvanically connected with the additional electrodes by means of electric line 13 as shown in FIG. 3d. In the case where a noticeable ion current still flows between electrodes 3 and 6, electric line 27 as shown in FIG. 3e, or electric line 27′ with load 12′ therein, can also be used as lines 7′ and 7″ were used in FIGS. 3a and 3b. FIG. 3f shows the use of line 27′.

The preferred form of the use of additional electrodes in accordance with the present invention is shown with reference to FIG. 3a wherein additional electrode 6′ is, in effect, replaced by hydrogen diffusion electrode 2 which has the most negative potential of all the electrodes in the fuel cell battery. In this instance electric line 7′ is used to galvanically connect electrode 2 with electrode 6 and cooler 8. Electric line 7″ is not used in this preferred embodiment. The preferred embodiment of FIG. 3a may also be modified by providing a galvanic connection between line 11 and cooler 8, as was provided by line 13 in FIG. 3d.

The present invention can also be used as indicated above with an electrochemical system in which the electrochemical device is a fuel cell battery which employs methanol therein as the fuel. An experiment was conducted with methanol as a fuel using the equipment shown in FIG. 4. FIG. 4 shows the use of an additional electrode, according to the teachings of the present invention, in combination with a methanol fuel cell battery. Fuel cell battery 101 in FIG. 4 contains 24 individual cells S which are connected with one another electrically in series, and each of such cells contains a positive oxygen electrode 55 or 55′ and a negative methanol electrode 110 or 110′. Electrode 55 is the most positive electrode and electrode 110 is the most negative electrode in the battery. Electrodes 110 and 110′ are porous electrodes and methanol fuel was supplied to such electrodes along with electrolyte by means of electrolyte line 33 and branch lines 33′. The electrolyte employed in this instance was a 6 normal aqueous solution of potassium hydroxide. The oxygen electrodes 55 and 55' were porous oxygen diffusion electrodes commonly employed in the art. The means for supplying oxygen to the oxygen electrodes are not shown. The oxygen electrodes were made from sintered Raney-silver and carbonyl nickel. Electrolyte cooler 44 is essentially a vaned copper tube and is the element of the electrolyte circuit that was to be protected against corrosion in accordance with the present invention. For this purpose additional electrode 66, in container 46, and labyrinthian disc device 75 were inserted in that portion of the electrolyte circuit 74 which lies between cooler 44 and oxygen electrode 55. Electrolyte lines 74' and 74 recirculate electrolyte and methanol fuel from the cells to labyrinthian disc device 75 and the rest of the electrolyte circuit. Additional electrode 66 is a methanol electrode commonly employed in the art and contains noble metal catalyst, which, in electrochemical characteristics and physical structure, essentially corresponds to electrode 110 in battery 101. Methanol fuel for additional electrode 66 was also supplied to such electrode by means of the electrolyte circuit system. Copper cooler 44 was galvanically connected to electrode 66 by means of electric line 88 and electrode 66 was galvanically connected to electrode 110 over electric line 99. By means of electric line 88, therefore, cooler 44 is maintained at the potential of electrode 66, which latter electrode has a potential in the range of a reversible hydrogen electrode, and cooler 44 is thus protected against corrosion since the ionic shunt current flowing in electrolyte line 74 is transformed into an electronic current at electrode 66 and the electronic current by-passes cooler 44 through line 99.

The utility of the arrangement shown in FIG. 4 can be verified with the aid of an electric current measuring device with which the current in line 99 is measured. The current flowing in line 99 amounts to about 10 milliamps during the operation of the electrochemical system shown in FIG. 4 as described above. This flow of electric current in line 99 indicates that cooler 44 is not being corroded by ions in the electrolyte.

FIG. 5 shows an electrochemical system employing the present invention in which the electrochemical device is an electrolyzer. In FIG. 5, electrolyzer 101' is used for the electrolysis of 6 normal aqueous potassium hydroxide. Electrolyzer 101' contains 24 individual electrolysis cells R which are connected together electrically in series. Each cell contains an electrode 105 for the generation therein of hydrogen and an electrode 106 for the generation therein of oxygen. These electrodes are all porous gas diffusion electrodes which contain an inner coarse pored catalyst layer and an outer fine pored cover layer. Hydrogen or oxygen gas is then generated in the inner coarse pored layers and carried from the electrodes over gas lines to gas consumers. The oxygen gas carry-off lines are not shown in FIG. 5. The hydrogen gas carry-off lines 14' and 14 carry hydrogen gas from the hydrogen electrodes to consumer P. Electrolyte is circulated to electrolyzer 101' through electrolyte lines 38 and 38', and is recirculated through electrolyte lines 78' and 78, labyrinthian disc device 75', container 46' housing additional electrode 66', copper cooler 44' and container 56 housing additional electrode 76. Electrodes 66 and 76 are galvanically connected to each other over electric lines 109 and 109' and to the most negative hydrogen electrode 105 in electrolyzer 101'. Electrodes 66' and 76 are also galvanically connected by electric line 98 to cooler 44'. Copper cooler 44' is the element of the electrolyte circuit being protected against corrosion. The source of the electric current for the operation of electrolyzer 101' is not shown. Additional electrodes 66' and 76 are hydrogen diffusion electrodes of the type used for electrodes 105 and additional electrodes 66' and 76 are supplied with hydrogen gas for the operation of such electrodes by tapping a portion of the hydrogen gas generated in electrodes 105 and supplying it to electrodes 66' and 76 over hydrogen gas lines 15 and 15'. The cross sectional area and length of electrolyte line 78 and labyrinthian device 75' are so proportioned that the electrical resistance of electrolyte in the electrolyte line is sufficient to limit to 50 milliamps the current emanating from electrodes 66' and 76 as a result of the transformation of the ionic shunt current in such electrodes.

Figure 6:
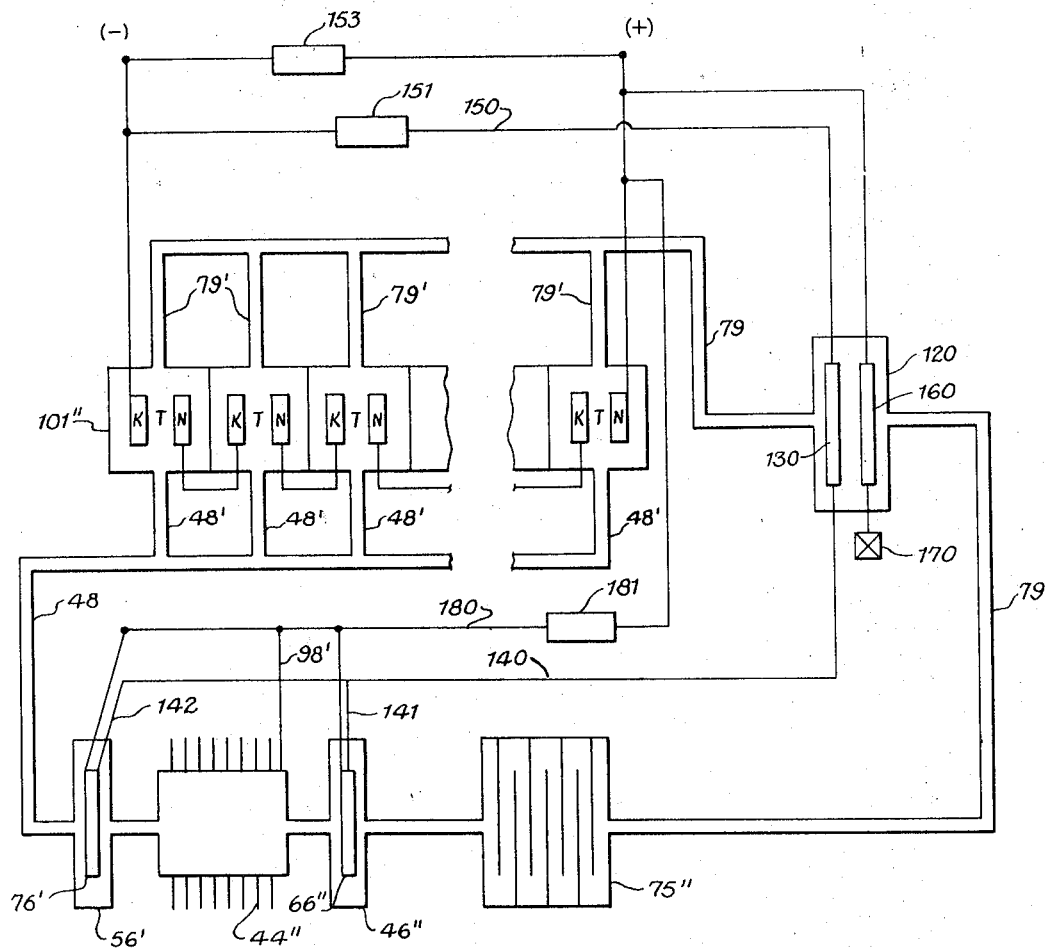
FIG. 6 shows a detailed embodiment of the present invention employing two additional electrodes and an accumulator battery as an electrochemical device.

FIG. 6 shows an electrochemical system employing the present invention in which the electrochemical device is an alkaline nickel-cadmium accumulator battery 101'' The accumulator battery consists of 10 individual cells T each of which has a cadmium anode K and a nickel cathode N. The cells are connected electrically in series. The individual cells are supplied with electrolyte over electrolyte lines 48 and 48'. From the accumulator battery the electrolyte is recirculated through electrolyte lines 79' and 79, electrolyzer 120, labyrinthian disc device 75'', container 46'' housing additional electrode 66'', cooler 44'' and container 56' housing additional electrode 76'. Cooler 44' is essentially a vaned iron pipe and it is the element of the electrolyte circuit which is intended to be protected against corrosion by the use of the additional electrodes in accordance with the present invention. Electrolyzer 120 contains two electrodes 130 and 160 which are used for the preparation therein of hydrogen gas and oxygen gas, respectively, by electrolysis of electrolyte, i.e., KOH. Electrolyzer 120 is galvanically connected to the accumulator battery 101'' over electric line 150 and through preresistor 151. In this way, electrolyzer 120 receives the line voltage necessary for the decomposition of the aqueous electrolyte into hydrogen gas and oxygen gas. Electrodes 130 and 160 are porous valved gas diffusion electrodes. The hydrogen gas produced in the working layer of electrode 130 is supplied to additional electrodes 66'' and 76', which are hydrogen diffusion electrodes, over gas lines 140, 141 and 142 for the operation of such additional electrodes in accordance with the present invention. The oxygen gas produced in electrode 160 is not needed in the electrochemical system of FIG. 6 and can be vented off through valve 170. By the use of labyrinthian device 75'' of a suitable size it is possible to hold the current passing through additional electrodes 66'' and 76' to less than 10 milliamps. Under such circumstance the amount of hydrogen needed in electrodes 66'' and 76', therefore, is relatively small and it could readily be supplied from electrode 130 using a relatively low current from electric line 150, so that preresistor 151 could have a resistance value of approximately 1 kiloohm. Cooler 44'' was provided with the potential of hydrogen electrodes 66'' and 76' by galvanically connecting the cooler to such electrodes with electric line 98'. Electrodes 66'' and 76' were also galvanically connected through electric line 180 and preresistor 181 with the positive nickel electrode N closest to electrolyte line 79. Resistance 153 acts as a load for the accumulator battery.

In all the electrolyte circuits shown in the drawings the electrolyte is pumped through the circuits by means of pumps which are not shown. Also not shown are means for replenishing the supply of electrolyte as it is consumed.

We claim:
1. In an electrochemical system comprising:
an electrochemical device comprising at least one electrochemical cell having one positive and one negative electrode,
one of said negative electrodes having the most negative polarity and having an electrochemical potential within the range of the potential of a reversible hydrogen electrode,
chemicals, including electrolyte, for the electrochemical operation of said device,
means for supplying said chemicals to said device and comprising closed electrolyte circuit means within and without said device for circulating said electrolyte to and from said device, said electrolyte circuit means having at least one element of construction therein, in a portion of said electrolyte circuit means which is outside said device, which comprises at least one component which is soluble in said electrolyte at a potential which is more positive than the potential of a reversible hydrogen electrode, the improvement comprising
an additional electrode which is a fuel consuming electrode
having a potential within the range of a reversible hyrogen electrode when consuming fuel therein, and
being in electrolyte supply communication in in a portion of said electrolyte circuit means which is outside said device and between said component and the most positive electrode in said device.
fuel for said additional electrode, and means for supplying said fuel to said additional electrode.

2. An electrochemical system as in claim 1 in which said additional electrode is galvanically connected to said component.

3. An electrochemical system as in claim 1 in which said additional electrode is galvanically connected to the negative electrode in said electrochemical device which has the most negative polarity.

4. An electrochemical system as in claim 2 in which said additional electrode is also galvanically connected over a load to the positive electrode in said electrochemical device which has the highest potential.

5. An electrochemical system as in claim 1 further comprising means for increasing the electrical resistance of said electrolyte in said electrolyte circuit means between said additional electrode and the most positive electrode in said electrochemical device.

6. An electrochemical system as in claim 1 in which said electrochemical device is a fuel cell battery.

7. An electrochemical system as in claim 1 in which said electrochemical device is an accumulator battery.

8. An electrochemical system as in claim 6 in which the fuel for said additional electrode contains hydrogen.

9. An electrochemical system as in claim 8 in which said fuel is hydrogen and said additional electrode and the negative electrodes of said battery are all hydrogen diffusion electrodes.

10. An electrochemical system as in claim 8 in which said fuel is methanol and said additional electrode and the negative electrodes of said battery are all methanol electrodes.

11. An electrochemical system as in claim 1 in which said component comprises a metal selected from the group consisting of copper, nickel and iron.

12. In an electrochemical system comprising:
an electrochemical device comprising at least one electrochemical cell having one positive and one negative electrode,
one of said negative electrodes having the most negative polarity and having an electrochemical potential within the range of the potential of a reversible hydrogen electrode,
chemicals, including electrolyte, for the electrochemical operation of said device,
means for supplying said chemicals to said device and comprising closed electrolyte circuit means within and without said device for circulating said electrolyte to and from said device,
said electrolyte circuit means having at least one element of construction therein, in a portion of said electrolyte circuit means which is outside said device, which comprises at least one component which is soluble in said electrolyte at a potential which is more positive than the potential of a reversible hydrogen electrode, the improvement comprising
an additional electrode which is a fuel consuming electrode
having a potential within the range of a reversible hydrogen electrode when consuming fuel therein,
being galvanically connected to the negative electrode in said device having the most negative polarity, and
being in electrolyte supply communication in a portion of said circuit which is outside said device and between said component and the most positive electrode in said device,
fuel for said additional electrode, means for supplying said fuel to said additional electrode, and
means for increasing the electrical resistance of said electrolyte in that portion of said electrolyte circuit means which is between said additional electrode and the most positive electrode in said electrochemical device.

13. An electrochemical system as in claim 12 in which said additional electrode is also galvanically connected to said component.

14. In an electrochemical system comprising:
an electrochemical device comprising at least one electrochemical cell having one positive and one negative electrode,
one of said negative electrodes having the most negative polarity and having an electrochemical potential within the range of the potential of a reversible hydrogen electrode,
chemicals, including electrolyte, for the electrochemical operation of said devices,
means for supplying said chemicals to said device and comprising closed electrolyte circuit means within and without said device for circulating said electrolyte to and from said device,
said electrolyte circuit means having at least one element of construction therein, in a portion of said electrolyte circuit means which is outside said device, which comprises at least one component which is soluble in said electrolyte at a potential which is more positive than the potential of a reversible hydrogen electrode, the improvement comprising
two additional electrodes which are fuel consuming electrodes
having potentials within the range of a reversible hydrogen electrode when consuming fuel therein, and
being in electrolyte supply communication in portions of said circuit which are outside said device such that the first of said additional electrodes is between said component and the most positive electrode in said device and the second of said additional electrodes is between said component and the most negative electrode in said device,
fuel for said additional electrodes, and means for supplying said fuel to said additional electrodes.

15. An electrochemical system as in claim 14 in which said additional electrodes are galvanically connected to each other.

16. An electrochemical system as in claim 15 in which said additional electrodes are also galvanically connected to said component.

17. An electrochemical system as in claim 14 in which said additional electrodes are also galvanically connected to the electrode in said device having the most negative polarity.

18. An electrochemical system as in claim 14 in which said additional electrodes are also galvanically connected over a load to the positive electrode in said electrochemical device which has the highest potential.

19. An electrochemical system as in claim 14 further comprising means for increasing the electrical resistance of said electrolyte in said electrolyte circuit between the first of said additional electrodes and the most positive electrode in said electrochemical device.

20. An electrochemical system as in claim 14 in which said electrochemical device is a fuel cell battery.

21. An electrochemical system as in claim 20 in which the fuel for said battery and said additional electrodes contains hydrogen.

22. An electrochemical system as in claim 21 in which said fuel is hydrogen and said additional electrodes and the negative electrodes of said battery are all hydrogen diffusion electrodes.

23. An electrochemical system as in claim 14 in which said component comprises a metal selected from the group consisting of copper, nickel and iron.

24. An electrochemical system as in claim 14 in which said electrochemical device is an accumulator battery.

25. In an electrochemical system comprising:
   an electrochemical device comprising at least one electrochemical cell having one positive and one negative electrode,
      one of said negative electrodes having the most negative polarity and having an electrochemical potential within the range of the potential of a reversible hydrogen electrode,
   an electrolyte for said device, and a closed electrolyte circuit within and without said device for circulating said electrolyte to and from said device,
      said electrolyte circuit having at least one element of construction therein, in a portion of said circuit which is outside said device, which comprises at least one component which is soluble in said electrolyte at a potential which is more positive than the potential of a reversible hydrogen electrode,
   the improvement comprising
      two additional electrodes which are fuel consuming electrodes
         having potentials within the range of a reversible hydrogen electrode when consuming fuel therein,
         being galvanically connected to each other and to the electrode in said device having the most negative polarity, and
         being in electrolyte supply communication in portions of said circuit which are outside said device such that the first of said additional electrodes is between said component and the most positive electrode in said device and the second of said additional electrodes is between said component and the most negative electrode in said device,
      fuel for said additional electrodes, means for supplying said fuel to said additional electrodes, and
      means for increasing the electrical resistance of said electrolyte in said electrolyte circuit between the first of said additional electrodes and the most positive electrode in said electrochemical device.

26. In a process for conducting an electrochemical reaction in which an electrolyte is electrochemically employed in an electrochemical device which employs at least one electrochemical cell having one negative and one positive electrode, and said electrolyte is circulated to and from said device in a circulation system which comprises at least one element of construction which is soluble in said electrolyte at a potential which is more positive than the potential of a reversible hydrogen electrode due to reaction between said element of construction and shunt current from said device, the improvement comprising:
   operating, in electrolyte supply communication, an additional negative electrode which has a potential within the range of the potential of a reversible hydrogen electrode in a portion of said circuit which is outside said device and is between said element of construction and the most positive electrode in said device and at a level of negative ion output from said additional negative electrode as will react with substantially all of said shunt current and prevent said shunt current from contacting said element of construction and thereby prevent the dissolution of said element of construction in said electrolyte.

27. In a process for conducting an electrochemical reaction in which an electrolyte is electrochemically employed in an electrochemical device which employs at least one electrochemical cell having one negative and one positive electrode, and said electrolyte is circulated to and from said device in a circulation system which comprises at least one element of construction which is soluble in said electrolyte at a potential which is more positive than the potential of a reversible hydrogen electrode due to reaction between said element of construction and shunt current from said device, the improvement comprising:
   operating, in electrolyte supply communication, two additional electrodes which have potentials within the range of the potential of a reversible hydrogen electrode,
      the first of said additional electrodes being operated in a portion of said circuit which is outside said device and is between said element of construction and the most positive electrode in said device, and
      the second of said additional electrodes being operated in a portion of said circuit which is outside said device and is between said element of construction and the most positive electrode in said device,
   at a level of negative ion output from such additional electrodes as will react with substantially all of said shunt current and prevent said shunt current from contacting said element of construction and thereby prevent the dissolution of paid element of construction in said electrolyte.

References Cited

UNITED STATES PATENTS

| | | | |
|---|---|---|---|
| 3,081,241 | 3/1963 | Smith | 204—149 |
| 2,925,455 | 2/1960 | Eidensohn et al. | 136—86 |

WINSTON A. DOUGLAS, Primary Examiner

H. A. FEELEY, Assistant Examiner

U.S. Cl. X.R.

204—147